US012168833B1

(12) United States Patent
He et al.

(10) Patent No.: US 12,168,833 B1
(45) Date of Patent: Dec. 17, 2024

(54) ELECTRIFICATION AND LEACHING AGENT FOR MINING RARE EARTH ORE BY ELECTRIFICATION

(71) Applicant: Guangzhou Institute of Geochemistry, Chinese Academy of Sciences, Guangdong (CN)

(72) Inventors: Hongping He, Guangdong (CN); Jianxi Zhu, Guangdong (CN); Gaofeng Wang, Guangdong (CN); Xiaoliang Liang, Guangdong (CN); Wei Tan, Guangdong (CN); Jie Xu, Guangdong (CN); Jingming Wei, Guangdong (CN); Shichang Kang, Guangdong (CN); Yongqiang Yang, Guangdong (CN); Yongjin Xu, Guangdong (CN); Xiaoshan Zou, Guangdong (CN)

(73) Assignee: Guangzhou Institute of Geochemistry, Chinese Academy of Sciences, Guangzhou (CN)

( * ) Notice: Subject to any disclaimer, the term of this patent is extended or adjusted under 35 U.S.C. 154(b) by 0 days.

(21) Appl. No.: 18/410,527

(22) Filed: Jan. 11, 2024

(30) Foreign Application Priority Data

Sep. 15, 2023 (CN) .......................... 202311194801.1

(51) Int. Cl.
*C22B 3/04* (2006.01)
*C25C 1/22* (2006.01)

(52) U.S. Cl.
CPC ..................................... *C25C 1/22* (2013.01)

(58) Field of Classification Search
CPC ................ C25C 1/00; C25C 1/22; C22B 3/04
See application file for complete search history.

(56) References Cited

U.S. PATENT DOCUMENTS 4,375,421 A    3/1983  Rubin et al.

FOREIGN PATENT DOCUMENTS

| CN | 106507806 | B |   | 10/2016 |              |
|----|-----------|---|---|---------|--------------|
| CN | 109402417 |   | * | 3/2019  | ... C22B 3/04 |
| CN | 112011697 | A |   | 12/2020 |              |
| CN | 116640923 | A |   | 8/2023  |              |

* cited by examiner

*Primary Examiner* — Zulmariam Mendez

(57) ABSTRACT

Disclosed are a method for mining rare earth ore by electrification and a leaching agent for mining rare earth ore by electrification. The method includes: arranging liquid injection holes in a mining area, arranging electrically conductive liquid injection pipes in the liquid injection holes, and connecting N electrically conductive liquid injection pipes in a same row in parallel to an electrification control system; and adding a leaching agent into the liquid injection holes, and applying a direct current between electrodes by the electrification control system, the leaching agent including small molecular betaine. According to the present disclosure, the betaine can reduce the wetting resistance between solid and liquid phases, and promote the wetting and infiltration effects of a leaching agent solution on soil.

5 Claims, 3 Drawing Sheets

ELECTRIFICATION AND LEACHING AGENT FOR MINING RARE EARTH ORE BY ELECTRIFICATION

CROSS-REFERENCE TO RELATED APPLICATIONS

This application claims priority of Chinese Patent Application No. 202311194801. 1, filed on Sep. 15, 2023, the entire contents of which are incorporated herein by reference.

TECHNICAL FIELD

The present disclosure relates to the technical field of rare earth mining, in particular to a method for mining rare earth ore by electrification and a leaching agent for mining rare earth ore by electrification.

BACKGROUND

Ion-adsorbed rare earth is a characteristic resource, which provides more than 90% medium and heavy rare earth for the whole world. However, the existing in-situ leaching process of ammonium salt has some problems, such as serious ecological environment damage, long leaching period, low resource extraction rate and easy landslide, which seriously restricts the mining and utilization of ion-adsorbed rare earth resources.

In CN109402417A, it is proposed to mine rare earth ore by an electrical method, which mainly includes the insertion of an anode liquid injection pipe and a cathode liquid collection pipe into a rare earth mine body, the injection of a leaching agent and a salt solution into the anode liquid injection pipe, and the application of a direct current between the anode liquid injection pipe and the cathode liquid collection pipe to improve the extraction rate of rare earth and shorten the mining time.

However, under the condition of an electric field generated by electrifying, rare earth ions and currently used leaching agent cations are accelerated to migrate directionally along the anode to the cathode, the time for exchanging the rare earth ions by the leaching agent is reduced, and the leaching rate of rare earth is reduced, which affects the mining efficiency.

According to a method for purifying dehydroepiandrosterone by an emulsion leaching method with an application number of 201610059824.5, an emulsifier indicated in the claim 2 is lauroamide propyl betaine. Lauroamide propyl betaine, as an anionic surfactant, can improve the purity of dehydroepiandrosterone by utilizing the properties of betaine as the anionic surfactant, but the mining of ionic rare earth ore needs to utilize other properties of betaine.

According to a method for leaching and separating bismuth from blast furnace gas ash or/and mud with an application number of 202110602788.3, the quaternary ammonium salt described in claim 5 includes at least one of choline chloride, betaine and hydroxypropyl trimethyl ammonium chloride. The principle is that an oxalate deep eutectic solvent prepared by mixing quaternary ammonium salt and oxalic acid is used as a leaching agent, and oxalic acid and iron are mainly utilized to react to form ferric oxalate.

SUMMARY

An object of the present disclosure is to solve the defects in the prior art, and provide a method for mining rare earth ore by electrification and a leaching agent for mining rare earth ore by electrification, aiming at solving the problem that the exchange and leaching efficiency of rare earth in soil by the leaching agent in the existing method for mining rare earth ore by electrification is low.

The present disclosure adopts the following technical solutions.

A leaching agent for mining rare earth ore by electrification includes ammonium salt and small molecular betaine; or
  calcium salt and small molecular betaine; or
  magnesium salt and small molecular betaine; or
  sodium salt and small molecular betaine; or
  potassium salt and small molecular betaine.

In some examples, the small molecular betaine is selected from at least one of betaine anhydrous, sulfobetaine, butyl betaine, oxibetaine and crotonobetaine.

Alternatively, the small molecular betaine is betaine anhydrous.

In another aspect, the present disclosure further provides a method for mining rare earth ore by electrification, including:
  arranging at least two rows and at least one column of liquid injection holes in a mining area, arranging electrically conductive liquid injection pipes in the liquid injection holes, and connecting N (N≥2 and N being a positive integer) electrically conductive liquid injection pipes in a same row in parallel to an electrification control system according to a current when each of the electrically conductive liquid injection pipes is electrified; and
  adding a leaching agent into the liquid injection holes, and then applying a direct current between the electrically conductive liquid injection pipes by the electrification control system,
  the leaching agent including small molecular betaine.

A voltage is applied to an anode and a cathode; and under the action of electric field force, rare earth ions displaced by the leaching agent can quickly flow to the cathode, which accelerates the leaching progress of rare earth ions and saves the leaching time.

The leaching agent includes small molecular betaine, and carboxylate ions in its structure can combine with the leached rare earth ions, which promotes the positive ion exchange reaction and improves the exchange efficiency of rare earth in soil by the leaching agent. Rare earth ions combined with carboxylate and groups with positive charges in the betaine structure accelerate the directional migration along the anode to the cathode under the action of electrification, and are leached together. Therefore, the negative charge group and positive charge group in the betaine structure can promote the exchange of rare earth in soil by the leaching agent and accelerate the migration of exchanged rare earth ions. At the same time, as a surfactant, the betaine can reduce the wetting resistance between solid and liquid phases and promote the wetting and infiltration effects of the leaching agent solution on soil, strengthening the ion exchange process between the leaching agent and the rare earth on the one hand, and reducing the migration resistance of solutes such as rare earth on the other hand, which is conducive to improving the efficiency of rare earth mining.

In some examples, the small molecular betaine is selected from at least one of betaine anhydrous, sulfobetaine, butyl betaine, oxibetaine and crotonobetaine.

Alternatively, the small molecular betaine is betaine anhydrous.

In some examples, a dosage of the small molecular betaine is 0.5-7 times of a total mass of rare earth oxide.

Alternatively, the dosage of the small molecular betaine is 1-5 times of the total mass of the rare earth oxide.

In some examples, a voltage is applied to an anode and a cathode to cause a voltage gradient in an ore body to be 10-200 V/m.

In some examples, the leaching agent further includes ammonium salt, calcium salt, magnesium salt, sodium salt or potassium salt.

Alternatively, the leaching agent further includes at least one of ammonium sulfate, ammonium chloride, ammonium acetate, ammonium citrate, calcium chloride, magnesium sulfate, potassium sulfate, sodium sulfate, potassium chloride and sodium chloride.

The present disclosure has the following beneficial effects.

1. The betaine is an amphoteric molecule with positive and negative charge groups in its structure, and carboxylate ions in its structure can combine with leached rare earth ions, which promotes the positive ion exchange reaction and improves the exchange efficiency of rare earth by the leaching agent. At the same time, the positive charge groups in its structure accelerate the directional migration along the anode to the cathode under the action of electrification, and carry the rare earth ions combined with carboxylate to be leached together, thus improving the recovery rate of rare earth. The positive and negative charge groups in the betaine structure can improve the exchange efficiency of the rare earth ions in soil by the leaching agent and the recovery rate of rare earth.

2. In addition, as the surfactant, the betaine can reduce the wetting resistance between solid and liquid phases and promote the wetting and infiltration effects of the leaching agent solution on soil, strengthening the ion exchange process between the leaching agent and the rare earth on the one hand, and reducing the migration resistance of the solutes such as rare earth on the other hand, which is conducive to further accelerating the flow of rare earth ions and leaching solution and improving the efficiency of rare earth mining.

3. Moreover, as a zwitterionic surfactant, the betaine has hydrophilic and oleophilic properties. The small molecular betaine is added into the leaching agent, which is beneficial to improve the swelling resistance of soil, improve the mine stability and reduce the risk of landslide in rare earth mining.

4. The small molecular betaine used in the present disclosure has small volume, good migration performance in soil pores, and is not prone to be blocked to avoid blocking pores and hindering the migration of the solute such as rare earth.

5. The small molecular betaine of the present disclosure is prone to be decomposed by the soil and has no environmental pollution.

DETAILED DESCRIPTION

In order to make the object, technical solutions and advantages of the present disclosure clearer, the technical solutions in the present disclosure is described clearly and completely below. Obviously, all the described examples are only some, rather than all examples of the present disclosure. Based on the examples in the present disclosure, all other examples obtained by those of ordinary skill in the art without creative efforts belong to the scope of protection of the present disclosure.

In the following, a method for mining rare earth ore by electrification and a leaching agent for mining rare earth ore by electrification in the examples of the present application will be described in detail.

Figure 1:
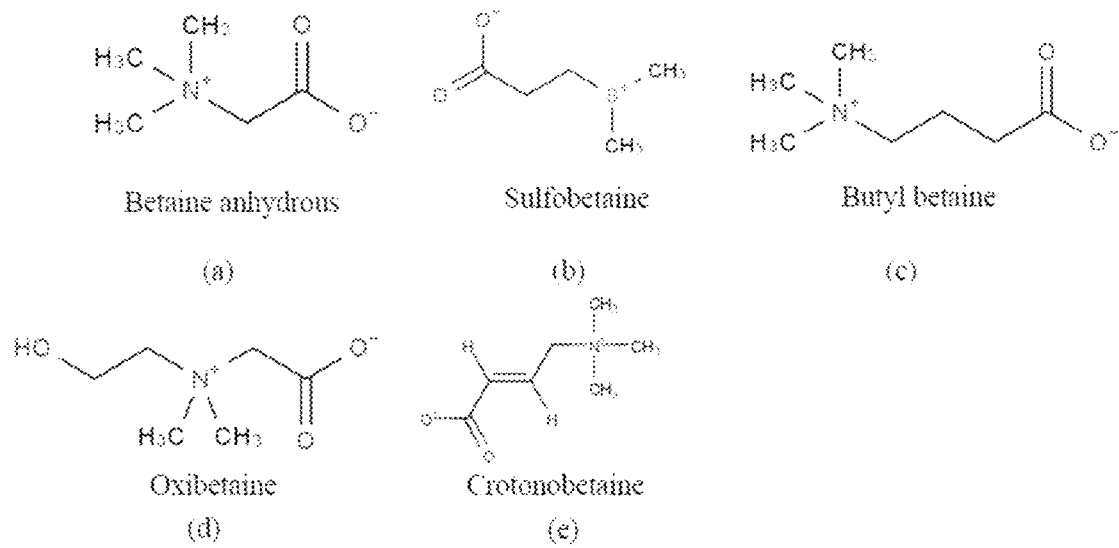
FIG. 1 is structural formulas of several small molecular betaines.
Figure 4:
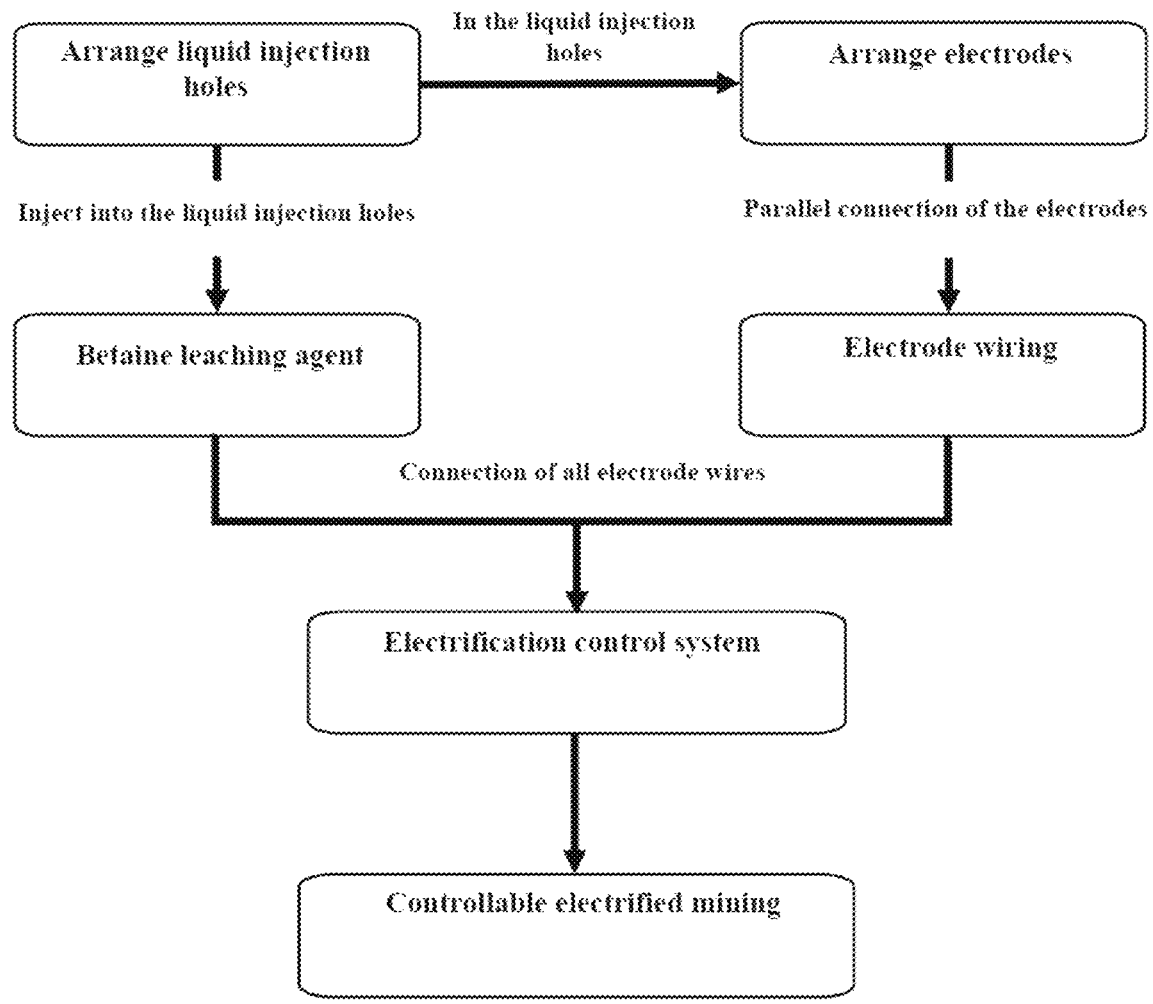
FIG. 4 is a flow chart of the steps of the present disclosure.

As shown in FIGS. 1 and 4, a method for mining rare earth ore by electrification of the present disclosure includes the following steps.

At least two rows and at least one column of liquid injection holes are arranged in a mining area, electrically conductive liquid injection pipes are arranged in the liquid injection holes, and N (N≥2 and N being a positive integer) electrically conductive liquid injection pipes in a same row are connected in parallel to an electrification control system according to a current when each of the electrically conductive liquid injection pipes is electrified.

A leaching agent is added into the liquid injection holes, and then a direct current is applied between the electrically conductive liquid injection pipes by an electrification control system, the leaching agent including small molecular betaine.

At least two rows of liquid injection holes are arranged in the mining area, and the number of rows of liquid injection holes can be 3, 4, 5, 1,000, etc. The number of rows of liquid injection holes is determined according to the area of the mining area, and the spacing of each of rows of liquid injection holes is 0.5-3 m, which can be 0.5 m, 1 m, 2 m or 3 m. The reason why there are at least two rows of liquid injection holes is that at least two rows of electrically conductive liquid injection pipes need to be arranged to form a group of positive and negative electrodes to carry out electrified mining.

At least one column of liquid injection holes is arranged in the mining area, and the number of columns of liquid injection holes can be 1, 4, 5, 50, 1,000, etc. The number of columns of liquid injection holes is determined according to the area of the mining area, and the spacing of each of columns of liquid injection holes is 0.5-3 m, which can be 0.5 m, 1 m, 2 m or 3 m. When there are multiple columns of liquid injection holes, electrodes in at least one column of liquid injection holes can be connected in parallel, specifically, which can be 3 columns in parallel, 5 columns in parallel, 10 columns in parallel, 50 columns in parallel, etc. The number of parallel columns depends on the current when each of the electrically conductive liquid injection pipes is electrified and the current borne by parallel cables.

The electrically conductive liquid injection pipe is arranged in the liquid injection hole, and the electrically conductive liquid injection pipe can be made of metal or nonmetal materials. The present disclosure does not limit the numbers of anodes and cathodes.

The leaching agent is added into the liquid injection holes, and then a direct current is applied between the electrically conductive liquid injection pipes by the electrification control system. There is a voltage between the electrically conductive liquid injection pipes, which forms a current under the action of the leaching solution, and under the action of the current, the rare earth ions displaced by the leaching agent can quickly flow to the cathode, which accelerates the migration rate of the rare earth ions and saves the mining time of rare earth.

However, the shorter the mining time of rare earth, the lower the recovery rate of rare earth. It is found that the main reason for the reduction of the recovery rate of rare earth is that the electric field is generated under the action of electrification, and the rare earth and leaching agent cations are accelerated to migrate directionally from an anode to a cathode, which shortens the time for exchanging rare earth ions in soil by the leaching agent and reduces the exchange efficiency of rare earth ions in soil by the leaching agent, and the exchanged and leached rare earth can be desorbed by the soil again. Therefore, under the condition of electrification, the exchange efficiency of rare earth in soil by cations in existing leaching agent is reduced.

The reaction of the exchange of rare earth in soil by the leaching agent is as follows:

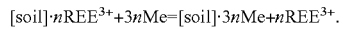
[soil]·$n$REE$^{3+}$+3$n$Me=[soil]·3$n$Me+$n$REE$^{3+}$.

To increase rare earth ions in soil for ion exchanged and leached by the leaching agent, the existing research employs an aiding leaching agent containing carboxylate to combine with the leached rare earth ions to promote the positive ion exchange reaction.

The reaction of the exchange of rare earth in soil by the carboxylate-containing leaching agent is as follows:

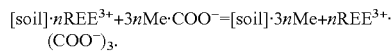
[soil]·$n$REE$^{3+}$+3$n$Me·COO$^-$=[soil]·3$n$Me+$n$REE$^{3+}$·(COO$^-$)$_3$.

However, the traditional leaching process mainly depends on gravity and water flow. After carboxylate ions combine with rare earth ions, the molecular volume is increased and the mobility is decreased, which leads to the slow liquid collection speed and the decrease of rare earth leaching solution in the traditional leaching process, and may also lead to the decrease of the recovery rate of rare earth.

In an example of the present application, the leaching agent includes small molecular betaine.

The betaine is an amphoteric molecule with positive and negative charge groups in its structure, and carboxylate ions in its structure can combine with leached rare earth ions, which promotes the positive ion exchange reaction and improves the exchange efficiency of rare earth by the leaching agent. The positive charge groups in its structure accelerate the directional migration along the anode to the cathode under the action of electrification, and carry the rare earth ions combined with carboxylate to be leached together, thus improving the exchange efficiency of rare earth ions in soil by the leaching agent and the recovery rate of rare earth.

At the same time, as a surfactant, the betaine can reduce the wetting resistance between solid and liquid phases and promote the wetting and infiltration effects of the leaching agent solution on soil, strengthening the ion exchange process between the leaching agent and the rare earth on the one hand, and reducing the migration resistance of solutes such as rare earth on the other hand, which is conducive to further accelerating the flow of rare earth ions and leaching solution and improving the efficiency of rare earth mining.

Moreover, as a zwitterionic surfactant, the betaine has hydrophilic and oleophilic properties. The small molecular betaine is added into the leaching agent, which is beneficial to improve the swelling resistance of soil, improve the mine stability and reduce the risk of landslide in rare earth mining.

The small molecular betaine contained in the leaching agent can increase the leaching rate of rare earth in the leaching solution by 10%-40%.

It is to be noted that in the examples of the present application, the leaching agent includes small molecular betaine with a short alkyl chain and a small molecular volume.

As an example, the small molecular betaine is selected from at least one of betaine anhydrous, sulfobetaine, butyl betaine, oxibetaine and crotonobetaine.

The small molecular betaine has small volume, good migration performance in soil pores, and is not prone to be blocked to avoid blocking pores and hindering the migration of the solute such as rare earth.

In addition, in an example of the present disclosure, the small molecular betaine is prone to be decomposed by the soil and has no environmental pollution.

It is to be noted that in an example of the present disclosure, the leaching agent includes small molecular betaine, which means that the leaching agent also includes other electrolytes.

As an example, the leaching agent further includes at least one of ammonium sulfate, ammonium chloride, ammonium acetate, ammonium citrate, calcium chloride, magnesium sulfate, potassium sulfate, sodium sulfate, potassium chloride and sodium chloride.

In an example of the present disclosure, a mass of carbonate is 0.5-5 times of a total mass of rare earth ore samples.

A dosage of the small molecular betaine is 0.5-7 times of a total mass of rare earth oxides, for example, which can be 0.6 times, 1 time, 1.3 times, 1.8 times, 2.1 times, 2.5 times, 2.7 times, 3.3 times, 4.1 times, 4.4 times or 7 times.

As mentioned above, when a voltage is applied between two electrodes, the rare earth ions in soil migrate directionally under the action of the electric field. Based on experimental results, a voltage gradient in the ore body is 10-200 V/m, which is beneficial for the rare earth ions to flow to the cathode. The voltage gradient in the ore body can be 10 V/m, 20 V/m, 50 V/m, 60 V/m, 100 V/m, 150 V/m or 200 V/m, etc.

It can be understood that in other examples of the present application, a voltage can be applied between the anode and the cathode according to the actual situation, so that the voltage gradient in the ore body is within other ranges.

The present disclosure also provides a leaching agent for mining rare earth ore by electrification, including ammonium salt and small molecular betaine; or
calcium salt and small molecular betaine; or
magnesium salt and small molecular betaine; or
sodium salt and small molecular betaine; or
potassium salt and small molecular betaine.

As an example, the leaching agent further includes at least one of ammonium sulfate, ammonium chloride, ammonium acetate, ammonium citrate, calcium chloride, magnesium sulfate, potassium sulfate, sodium sulfate, potassium chloride and sodium chloride.

As mentioned above, the leaching agent for mining rare earth ore by electrification provided by the present disclosure is suitable for the above method for mining rare earth ore by electrification.

The betaine is an amphoteric molecule with positive and negative charge groups in its structure, and carboxylate ions in its structure can combine with leached rare earth ions, which promotes the positive ion exchange reaction and improves the exchange efficiency of rare earth by the leaching agent. The positive charge groups in its structure accelerate the directional migration along the anode to the cathode under the action of electrification, and carry the rare earth ions combined with carboxylate to be leached together, thus improving the exchange efficiency of rare earth ions in soil by the leaching agent and the recovery rate of rare earth.

At the same time, as a surfactant, the betaine can reduce the wetting resistance between solid and liquid phases and promote the wetting and infiltration effects of the leaching agent solution on soil, strengthening the ion exchange process between the leaching agent and the rare earth on the one hand, and reducing the migration resistance of solutes such as rare earth on the other hand, which is conducive to further accelerating the flow of rare earth ions and leaching solution and improving the efficiency of rare earth mining.

Moreover, as a zwitterionic surfactant, the betaine has hydrophilic and oleophilic properties. The small molecular betaine is added into the leaching agent, which is beneficial to improve the swelling resistance of soil, improve the mine stability and reduce the risk of landslide in rare earth mining.

As an example, the small molecular betaine is selected from at least one of betaine anhydrous, sulfobetaine, butyl betaine, oxibetaine and crotonobetaine.

In addition, in an example of the present disclosure, the small molecular betaine is prone to be decomposed by the soil and has no environmental pollution.

It is to be noted that in the examples of the present application, the leaching agent includes small molecular betaine, which means that the leaching agent also includes other electrolytes.

As an example, the leaching agent further includes at least one of ammonium sulfate, ammonium chloride, ammonium acetate, ammonium citrate, calcium chloride, magnesium sulfate, potassium sulfate, sodium sulfate, potassium chloride and sodium chloride.

The features and performance of the present disclosure will be described in further detail with examples.

Example 1

The example provides a method for mining rare earth ore by simulating electrification in a laboratory, including the following steps.

A cylindrical device was used to simulate the mining of ion-adsorbed rare earth ore by electrification. 400 g of simulated weathering crust sample was added into a cylindrical pipe and compressed to 9.5 cm with a compaction density of 1.489 g/cm$^3$. 100 mL of betaine anhydrous solution with a molar concentration of 0.1 mol/L and 100 mL of ammonium sulfate solution with a molar concentration of 0.1 mol/L were added to the simulated weathering crust sample, and then 0.4 mL/min of deionized water was continuously dropped after complete wetting. Graphite electrode plates were applied on the top and bottom of the cylindrical device, and a direct current power supply of 20 V/m was applied. A leaching solution was continuously received at a cathode, and the changes of rare earth and leaching agent ions in the collection solution with time were recorded.

Figure 2:
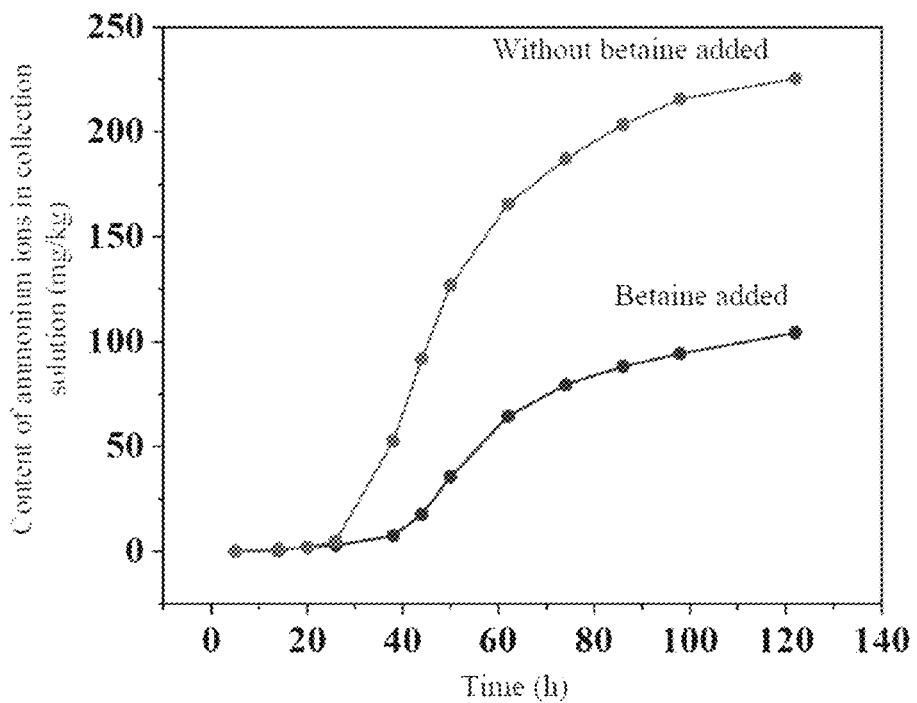
FIG. 2 is a graph showing the relationship between leaching agent cations in a leaching solution and time of Example 1 and Comparative Example 1.
Figure 3:
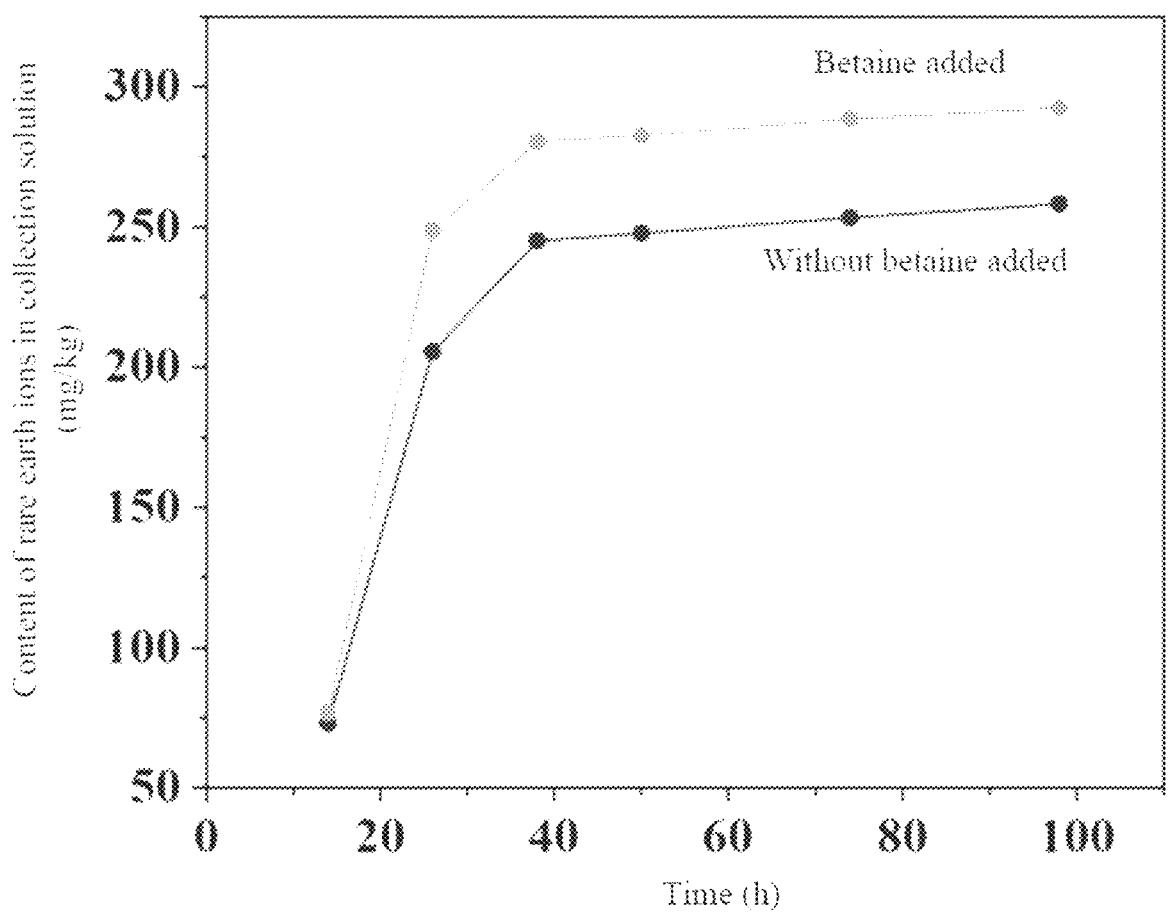
FIG. 3 is a graph showing the relationship between the rare earth in the leaching solution and the time of Example 1 and Comparative Example 1.

In a system with betaine anhydrous solution added, the changes of contents of ammonium ion and rare earth ion in the collection solution with the electrification time are shown in FIGS. 2 and 3.

Comparative Example 1

The Comparative Example 1 provides a method for mining rare earth ore by simulating electrification in a laboratory, which is different from Example 1 in that 200 mL ammonium sulfate solution with a molar concentration of 0.1 mol/L was added to the simulated weathering crust sample.

In a system with only ammonium sulfate added, the changes of contents of ammonium ion and rare earth ion in the collection solution with the electrification time are shown in FIGS. 2 and 3.

It can be seen from Example 1 and Comparative Example 1 that, compared with the ammonium sulfate solution as a leaching agent in Comparative Example 1, in Example 1, betaine solution was added as a leaching agent, and under the same voltage gradient, injection rate and concentration, the content of ammonium ion in the collection solution is decreased by 38%, and the content of rare earth ion is increased by 36%, indicating that the addition of betaine solution to the leaching agent can improve the exchange efficiency of leached rare earth ions in soil by the leaching agent and improve the recovery rate of rare earth.

FIG. 2 shows the relationship between leaching agent cations in a leaching solution and time of Example 1 and Comparative Example 1; and FIG. 3 shows the relationship between rare earth in a leaching solution and the time of Example 1 and Comparative Example 1. As can be seen from FIGS. 2 and 3, the content of cations in the leaching solution of Example 1 is obviously lower than that of Comparative Example 1, and the content of rare earth in the leaching solution of Example 1 is also obviously higher than that of Comparative Example 1, indicating that the addition of betaine solution to the leaching agent can improve the exchange and leaching efficiency of rare earth ions in soil by the leaching agent.

Example 2

The example provides a method for mining rare earth ore by electrification. Experiments were carried out in Renju mining area, Meizhou City, Guangdong Province. The method for mining rare earth ore by electrification includes the following steps.

(1) Arrangement of liquid injection holes and electrodes: 16 rows and 11 columns of 176 liquid injection holes were uniformly arranged in an experimental area with a length of 15 m and a width of 10 m. The spacing around the liquid injection hole was 1 m, and the depth of the liquid injection hole was 24 m. A 12 m-long electrode was arranged in each liquid injection hole, and the depth range of the electrodes was 12 m upward from the bottom of the liquid injection hole to cover the ore-rich layer. The electrodes were connected to 13-meter wires at the upper ends, and 11 columns of electrodes in each row were connected in parallel to a control system.

(2) Injection of a leaching agent: 2.5% ammonium sulfate solution by mass fraction was introduced into the liquid injection holes, a total dosage of ammonium sulfate being 2 times of a total amount of rare earth ions; and 2.5% sulfobetaine solution by mass fraction was introduced into the liquid injection holes, a total dosage of sulfobetaine being 1 time of a total amount of rare earth ions.

(3) Liquid collection: a kilometer borehole was arranged at the bottom of the mining area to collect the rare earth mother liquor by electrified mining.

1.36 tons of rare earth were collected in one month during the electrification mining, and the recovery rate of rare earth was 82%.

Comparative Example 2

The comparative example provides a method for mining rare earth ore by electrification. Experiments were carried out in Renju mining area, Meizhou City, Guangdong Province. The difference between the method and Example 1 lies in step (2). In the comparative example, a leaching agent was injected in the step (2), and 2.5% ammonium sulfate solution by mass fraction was introduced into the liquid injection holes, a total dosage of ammonium sulfate being 3 times of a total amount of rare earth ions.

In the comparative example, 1.01 tons of rare earth were collected in one month during the electrification mining, and the recovery rate of rare earth was 61%.

It can be seen from Comparative Example 2 and Example 2 that in the method provided by Example 2, the recovery rate of rare earth is increased by 21% compared with Comparative Example 2. In Example 2, the addition of small molecular betaine promotes the leaching agent to exchange rare earth in soil and improves the recovery rate of rare earth.

Example 3

The example provides a method for mining rare earth ore by electrification. Experiments were carried out in Renju mining area, Meizhou City, Guangdong Province. The difference between the method and Example 1 lies in step (2). In the example:
- a leaching agent was injected in the step (2), and ammonium sulfate solution with a molar concentration of 0.2 M was introduced into the liquid injection holes, a total dosage of ammonium sulfate being 3 times of a total amount of rare earth ions; and butyl betaine solution with a molar concentration of 0.2 M was introduced into the liquid injection holes, a total dosage of butyl betaine being 2 times of a total amount of rare earth ions.
- 1.56 tons of rare earth were collected in one month during the electrification mining, and the recovery rate of rare earth was 94%.

Comparative Example 3

The comparative example provides a method for mining rare earth ore by electrification. Experiments were carried out in Renju mining area, Meizhou City, Guangdong Province. The difference between the method and Example 3 lies in step (2). In the comparative example, a leaching agent was injected in the step (2), and ammonium sulfate solution with a molar concentration of 0.2 M was introduced into the liquid injection holes, a total dosage of ammonium sulfate being 5 times of a total amount of rare earth ions.

In the comparative example, 1.37 tons of rare earth were collected in one month during the electrification mining, and the recovery rate of rare earth was 83%.

It can be seen from Comparative Example 3 and Example 3 that in the method provided by Example 3, the recovery rate of rare earth is increased by 11% compared with Comparative Example 3.

To sum up, it can be seen that in the method provided by the example of the present disclosure, the small molecular betaine contained in the leaching agent can obviously improve the recovery rate of rare earth.

Finally, it is to be noted that: the above examples are only used to illustrate the technical solutions of the present disclosure, but not to limit this. Although the present disclosure has been described in detail with reference to the foregoing examples, the technical solutions described in the foregoing examples can still be modified, or some technical features can be replaced by equivalents; while these modifications or substitutions do not make the essence of the corresponding technical solutions deviate from the spirit and scope of the technical solutions of various examples of the present disclosure.

The invention claimed is:

1. A method for mining rare earth ore by electrification, comprising:
   step 1: arranging at least two rows and at least one column of liquid injection holes in a mining area, arranging electrically conductive liquid injection pipes in the liquid injection holes, and connecting N electrically conductive liquid injection pipes in a same row in parallel to an electrification control system according to currents when each of the electrically conductive liquid injection pipes is electrified, wherein N≥2 and N is a positive integer; and
   step 2: adding a leaching agent into the liquid injection holes, and then applying a direct current between the electrically conductive liquid injection pipes by the electrification control system,
   wherein the leaching agent is selected from a leaching agent for mining rare earth ore by electrification;
   wherein the leaching agent for mining rare earth ore by electrification comprises:
   ammonium salt and small molecular betaine; or
   calcium salt and small molecular betaine; or
   magnesium salt and small molecular betaine; or
   sodium salt and small molecular betaine; or
   potassium salt and small molecular betaine.

2. A method for mining rare earth ore by electrification, comprising:
   step 1: arranging at least two rows and at least one column of liquid injection holes in a mining area, arranging electrically conductive liquid injection pipes in the liquid injection holes, and connecting N electrically conductive liquid injection pipes in a same row in parallel to an electrification control system according to currents when each of the electrically conductive liquid injection pipes is electrified, wherein N≥2 and N is a positive integer; and
   step 2: adding a leaching agent into the liquid injection holes, and then applying a direct current between the electrically conductive liquid injection pipes by the electrification control system,
   wherein the leaching agent is selected from a leaching agent for mining rare earth ore by electrification;
   wherein the leaching agent for mining rare earth ore by electrification comprises:
   ammonium salt and small molecular betaine; or
   calcium salt and small molecular betaine; or
   magnesium salt and small molecular betaine; or
   sodium salt and small molecular betaine; or
   potassium salt and small molecular betaine;
   wherein the small molecular betaine is selected from at least one of betaine anhydrous, sulfobetaine, butyl betaine, oxibetaine and crotonobetaine; and
   alternatively, the small molecular betaine is betaine anhydrous.

3. The method for mining rare earth ore by electrification according to claim 1, wherein a dosage of small molecular betaine is 0.5-7 times of a total mass of rare earth oxide; and
   alternatively, the dosage of the small molecular betaine is 1-5 times of the total mass of the rare earth oxide.

4. The method for mining rare earth ore by electrification according to claim 1, wherein a voltage is applied to an anode and a cathode to cause a voltage gradient in an ore body to be 10-200 V/m.

5. The method for mining rare earth ore by electrification according to claim 1, wherein the leaching agent further comprises ammonium salt, calcium salt, magnesium salt, sodium salt or potassium salt; and alternatively, the leaching agent further comprises at least one of ammonium sulfate, ammonium chloride, ammonium acetate, ammonium citrate, calcium chloride, magnesium sulfate, potassium sulfate, sodium sulfate, potassium chloride and sodium chloride.

* * * * *